United States Patent
Park et al.

(10) Patent No.: US 11,884,171 B2
(45) Date of Patent: Jan. 30, 2024

(54) METHOD AND APPARATUS FOR MINIMIZING PARASITIC RESISTANCE OF OUTPUT CAPACITOR IN LDC

(71) Applicant: HYUNDAI MOBIS Co., Ltd., Seoul (KR)

(72) Inventors: Ji Hoon Park, Suwon-si (KR); Deok Kwan Choi, Yongin-si (KR); Won Gon Kim, Yongin-si (KR); Kang Min Kim, Seoul (KR); Min Heo, Seongnam-si (KR); Tae Ho Bang, Seoul (KR); Du Ho Kim, Yongin-si (KR); Hyun Woo Shim, Suwon-si (KR); Soo Min Jeon, Yongin-si (KR); A Ra Lee, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 108 days.

(21) Appl. No.: 17/532,525

(22) Filed: Nov. 22, 2021

(65) Prior Publication Data

US 2022/0161672 A1     May 26, 2022

(30) Foreign Application Priority Data

Nov. 23, 2020  (KR) .......................... 10-2020-0158125

(51) Int. Cl.
*H02M 3/335*     (2006.01)
*B60L 53/20*      (2019.01)
(Continued)

(52) U.S. Cl.
CPC ............... *B60L 53/20* (2019.02); *B60L 58/20* (2019.02); *H02M 1/084* (2013.01); *H02M 1/14* (2013.01);
(Continued)

(58) Field of Classification Search
CPC ............. H02M 3/335; H02M 3/33569; H02M 3/33584; H02M 3/1586; H02M 1/0043;
(Continued)

(56) References Cited

U.S. PATENT DOCUMENTS 10,079,541 B1 *   9/2018  Taban ............... H02M 3/33546
2012/0319478 A1 * 12/2012  Gentchev ................ H02M 1/14
                                                                    323/361
(Continued)

*Primary Examiner* — Gary L Laxton
(74) *Attorney, Agent, or Firm* — Morgan, Lewis & Bockius LLP

(57) ABSTRACT

A low-voltage DC-DC converter (LDC) includes: an N-phase power circuit configured by connection of N DC-DC converters in parallel between a high-voltage (HV) battery and a low-voltage (LV) battery; and one output capacitor commonly connected to an output of each phase DC-DC converter. Each phase of the N-phase power circuit is controlled in an interleaving manner which delays a phase by 360°/N. Here, each N-phase power circuit is controlled by switching at a frequency of [(a frequency at which the parasitic resistance (equivalent series resistance (ESR)) of the output capacitor is minimized)/N]. The parasitic resistance of the output capacitor of the LDC can be minimized. Accordingly, a lifespan of a battery can be improved and efficiency of the DC-DC converter can be increased through the reduction of the equivalent series resistance (ESR) of the output capacitor.

12 Claims, 6 Drawing Sheets

(51) Int. Cl.
*B60L 58/20* (2019.01)
*H02M 1/14* (2006.01)
*H02M 1/084* (2006.01)

(52) U.S. Cl.
CPC ..... *H02M 3/33569* (2013.01); *B60L 2210/10* (2013.01)

(58) Field of Classification Search
CPC ......... H02M 1/084; H02M 1/14; B60L 53/20; B60L 58/20; B60L 2210/10
See application file for complete search history.

(56) References Cited

U.S. PATENT DOCUMENTS

| | | | | |
|---|---|---|---|---|
| 2014/0015500 A1* | 1/2014 | Babazadeh | ......... | H02M 3/1584 |
| | | | | 323/272 |
| 2017/0338668 A1* | 11/2017 | Sada | ........................ | H02J 3/32 |

* cited by examiner

METHOD AND APPARATUS FOR MINIMIZING PARASITIC RESISTANCE OF OUTPUT CAPACITOR IN LDC

CROSS-REFERENCE TO RELATED APPLICATIONS

This application claims the benefit under 35 U.S.C. § 119(a) of Korean Patent Application No. 10-2020-0158125, filed on Nov. 23, 2020 in the Korean Intellectual Property Office, the entire disclosure of which is incorporated herein by reference for all purposes.

BACKGROUND

1. Field of the Invention

The present invention relates to a DC power supply (a low-voltage DC-DC converter (LDC) or DC-DC converter) of an automobile, and more specifically, to an output capacitor of an LDC and switching control.

2. Discussion of Related Art

A low-voltage DC-DC converter (LDC), which is a DC power supply applied to eco-friendly vehicles (HEV, PHEV, EV, FCV, etc.) by replacing an alternator of an internal combustion engine, is an essential device which charges a low-voltage battery (for example, 12V) by receiving high-voltage battery power (for example, 180 to 450V), or supplies power required for electrical equipment. Recently, with the development of autonomous driving technology, it is necessary to increase a capacity according to an increase of a low voltage (12V) electric load, and a bidirectional LDC with a boost function for transmitting low-voltage auxiliary battery power to a high voltage terminal is required. The reason is to prevent arcs occurring when a high voltage battery and a relay are connected by charging a high voltage link capacitor from 0V to 400V level.

Meanwhile, a lifespan of a low-voltage auxiliary battery is affected by a ripple of an output voltage/current of the LDC. Since a low-voltage load of an eco-friendly vehicle is a system which rapidly changes in an instant, the LDC which supplies power to the low-voltage load is required to have fast dynamic characteristics. In order to reduce this output voltage/current ripple, an output filter which is composed of an inductor and a capacitor and requires the fast dynamic characteristics is used at a terminal of the LDC. When the inductor is used in the output filter used to satisfy the output voltage/current ripple regulation of the existing LDC, it is difficult to control voltage step-down/step-up from 0V to 400V. In order to overcome this, a new technology which satisfies the output voltage/current ripple regulation of an LDC using only an output capacitor without an inductor has been developed.

Like the above, a method of increasing a switching frequency to regulate the LDC output voltage/current ripple using only an output capacitor is used. However, since switching loss of an active element increases in proportion to the switching frequency, there is a limit to increasing the switching frequency. Generally, the smaller the output voltage ripple the smaller equivalent series resistance (ESR; a.k.a., parasitic resistance) of the output capacitor, and a value of this ESR varies according to frequency characteristics of the capacitor.

Further, meanwhile, since a capacity of the LDC has recently increased due to introduction of the autonomous driving technology, a large capacity N-phase LDC in which N converters are controlled by parallel interleaving has been developed.

SUMMARY OF THE INVENTION

Recently, since a capacity of a low-voltage DC-DC converter (LDC) has increased due to introduction of an autonomous driving technology, development of a large-capacity N-phase type converter is emerging. In the N-phase interleaving type vehicle DC-DC converter, the present invention is directed to improving a lifespan of a 12V battery and increasing efficiency of the DC-DC converter through reduction of an equivalent series resistance (ESR) of an output capacitor.

According to an aspect of the present invention, there is provided an apparatus for minimizing the parasitic resistance of an output capacitor of a low-voltage DC-DC converter (LDC) including: an N-phase power circuit configured by connecting N DC-DC converters in parallel between a high-voltage (HV) battery and a low-voltage (LV) battery, in which N is a natural number greater than 1; and one output capacitor commonly connected to an output of each phase DC-DC converter, wherein each phase of the N-phase power circuit is controlled in an interleaving manner which delays a phase by 360°/N. Here, each power circuit of the N-phase is controlled by switching at a frequency of [(a frequency at which the parasitic resistance (ESR) of the output capacitor is minimized)/N].

More specifically, according to another aspect of the present invention, there is provided a method of minimizing the parasitic resistance of an output capacitor of an LDC, including: connecting N DC-DC converters in parallel to configure an N-phase power circuit, and commonly connecting one output capacitor to an output of each phase converter of the N-phase power circuit, wherein, each phase converter is interleaved with a phase delay of [360°/N], in which N is a natural number greater than 1; deriving a frequency f_im leading to the lowest impedance of the output capacitor commonly connected to the output of each phase converter; calculating f_im/N to calculate a shared frequency f_sh of each phase by dividing the derived frequency by N; and calculating a final switching frequency f_sw of each phase to control each phase converter based on a margin ratio r % so that $f\_sh*(1-r\%) \leq f\_sw \leq f\_sh*(1+r\%)$.

DETAILED DESCRIPTION OF EXEMPLARY EMBODIMENTS

Advantages and features of the present invention, and a method of achieving them, will be apparent with reference to preferable embodiments which is described in detail in conjunction with the accompanying drawings. However, the present invention is not limited to the embodiments which will be described below and may be implemented in different forms. The embodiments are only provided to completely disclose the present invention and completely convey the scope of the present invention to those skilled in the art, and the present invention is defined by the disclosed claims. Further, terms used in the description are provided not to limit the present invention but to describe the embodiments. In the embodiments, the singular form is intended to also include the plural form unless the context clearly indicates otherwise. The terms 'comprise' and/or 'comprising' as used herein are used not to preclude the presence or addition of at least one other component, step, operation, and/or element other than the stated components, steps, operations and/or elements. Hereinafter, preferable embodiments of the present invention will be described in detail with reference to the accompanying drawings. In the description of the embodiments, when detailed descriptions of related known components or functions may obscure principle of the present invention, the detailed descriptions thereof will be omitted.

Figure 1:
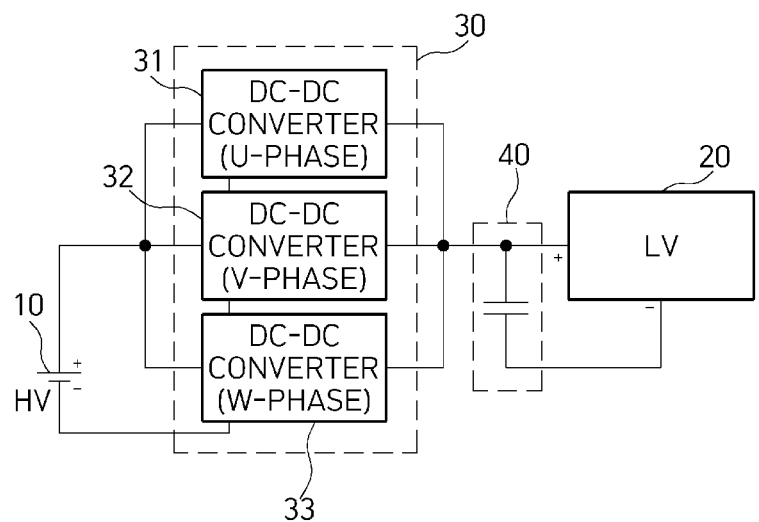
FIG. 1 is a block diagram of an embodiment of a three-phase low-voltage DC-DC converter (LDC) to which an equivalent series resistance (ESR) reduction method of an output capacitor of the present invention is applied.

FIG. 1 is a block diagram of an embodiment of a three-phase low-voltage DC-DC converter (LDC) to which an equivalent series resistance (ESR) reduction method of an output capacitor of the present invention is applied. As mentioned earlier, it was difficult to design an LDC with a capacity of 4 kW or more in one phase as the LDC is a system with a low voltage and high current load. Accordingly, in the embodiment in FIG. 1, a power circuit was optimized by connecting the DC-DC converters in three phases (U phase, V phase, and W phase) to configure a three-phase LDC.

That is, three DC-DC converters are connected in parallel between a high voltage (HV) battery 10 and a low voltage (LV) battery 20 to configure a three phase power circuit 30 of a U-phase 31, a V-phase 32, and a W-phase 33, and one output capacitor 40 is connected in common to the output of each of the phase DC-DC converters 31, 32, and 33. The LDC power circuit 30 is controlled to satisfy the ripple regulation of an LDC output voltage and a current by controlling the switching of the output capacitor 40.

Figure 2:
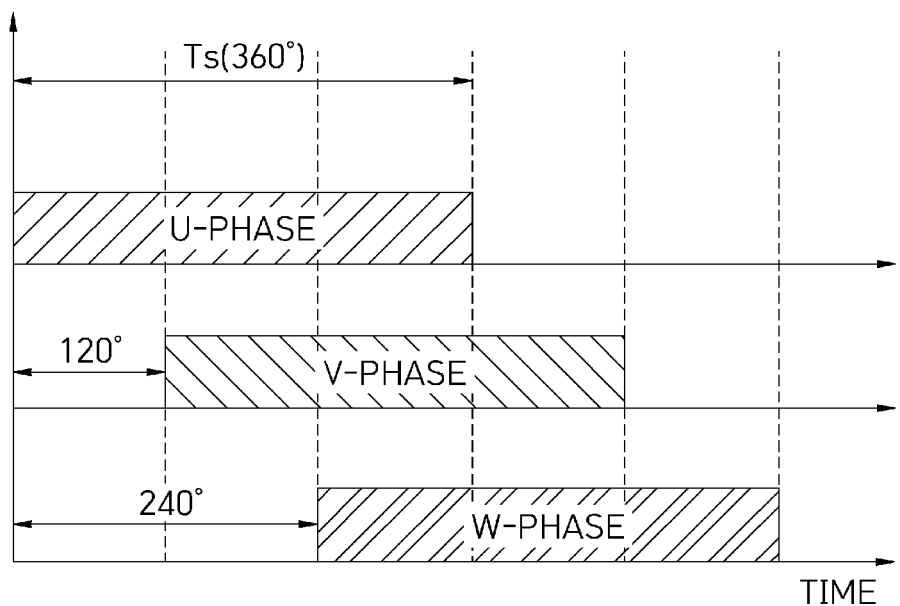
FIG. 2 is a conceptual diagram of interleaving control of each phase (U, V, and W) converter in FIG. 1.
Figure 8A:
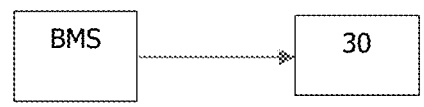
FIG. 8A shows a battery management system (BMS) to control the phase of the LDC shown in FIG. 1.
Figure 8B:
FIG. 8B shows an engine management system (EMS) to control the phase of the LDC shown in FIG. 1.

In the three-phase LDC as shown in FIG. 1, each of the phases (U, V, and W phases) is controlled by an interleaving method in which the phase is delayed by 120° as shown in FIG. 2. This interleaving control may be performed in hardware and software by a microcomputer implemented in a battery management system (BMS) which is shown in FIG. 8A or an engine management system (EMS) which is shown in FIG. 8B.

In the three-phase interleaving type vehicle LDC, since the output capacitor for each phase is shared as one output capacitor 40, a lifespan of a low voltage (for example, 12V) battery is improved and efficiency of the LDC increases by reducing the ESR (parasitic resistance, series equivalent resistance) of the output capacitor to reduce a ripple of the LDC output voltage and current.

Figure 3:
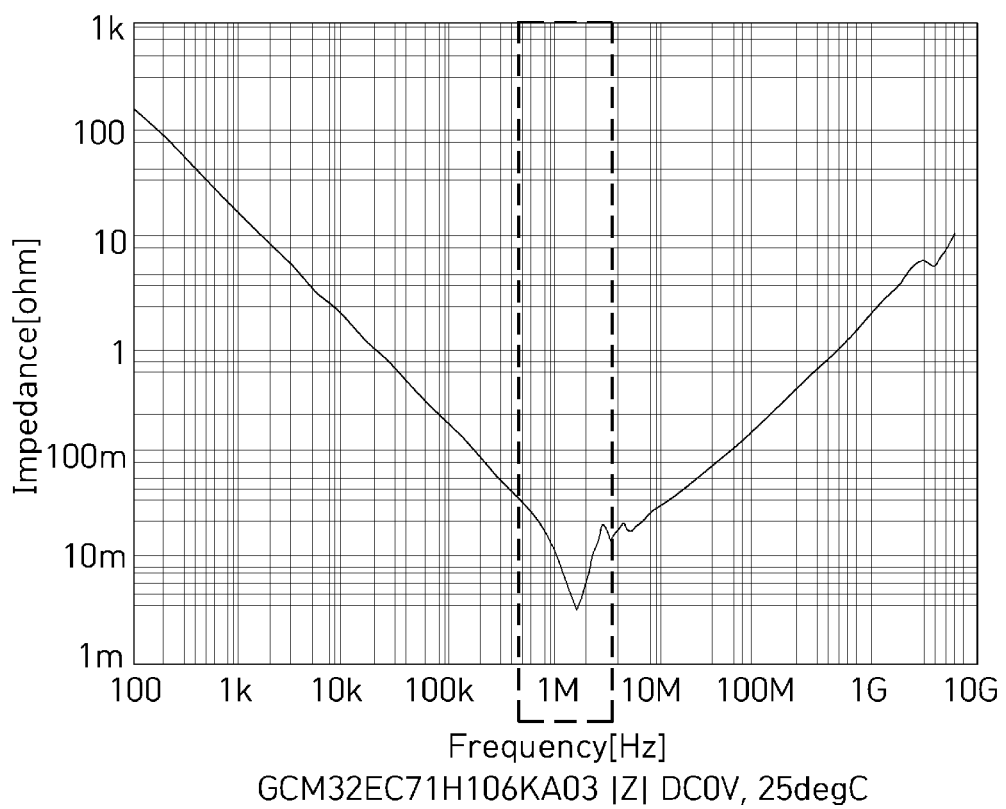
FIG. 3 is a graph illustrating an impedance characteristic for each frequency of a 10 µf multilayer ceramic capacitor (MLCC) used as the output capacitor.

Generally, a multilayer ceramic capacitor (MLCC), which is commonly used in the output capacitor 40, has the lowest ESR in a band having a switching frequency of 1 MHz. FIG. 3 is a graph illustrating an impedance characteristic for each frequency of a 10 μF MLCC used as the output capacitor 40. It can be seen that impedance is the lowest in a frequency band of roughly 1 MHz.

However, an Si or SiC series metal-oxide semiconductor field-effect-transistor (MOSFET), which is mainly used in automotive converters, has difficulty in a 1 MHz switching operation. Accordingly, in the embodiment in FIG. 1, an active element of the DC-DC converter of each phase through a three-phase interleaving operation is switched at 1 MHz/3, that is, roughly 333 kHz, so that the capacitor 40 of an output filter stage has a switching frequency of 333 kHz×3, that is, roughly 1 MHz (a frequency with the lowest ESR as shown in FIG. 3) is applied. In calculation, switching at a frequency of 333 kHz for each phase may be performed, but it is desirable to control the switching of the converters of each phase with a margin of plus/minus 10% in consideration of a tolerance, an operational error, and the like of each component. Accordingly, a switching frequency of roughly 1 MHz is applied to the output capacitor 40 by applying a switching frequency of roughly 300 to 366 kHz to each phase. Through this method, the ESR of the output capacitor 40 may be minimized, and accordingly, the lifespan of the 12V battery may be improved by reducing the output voltage/current ripple.

Figure 4:
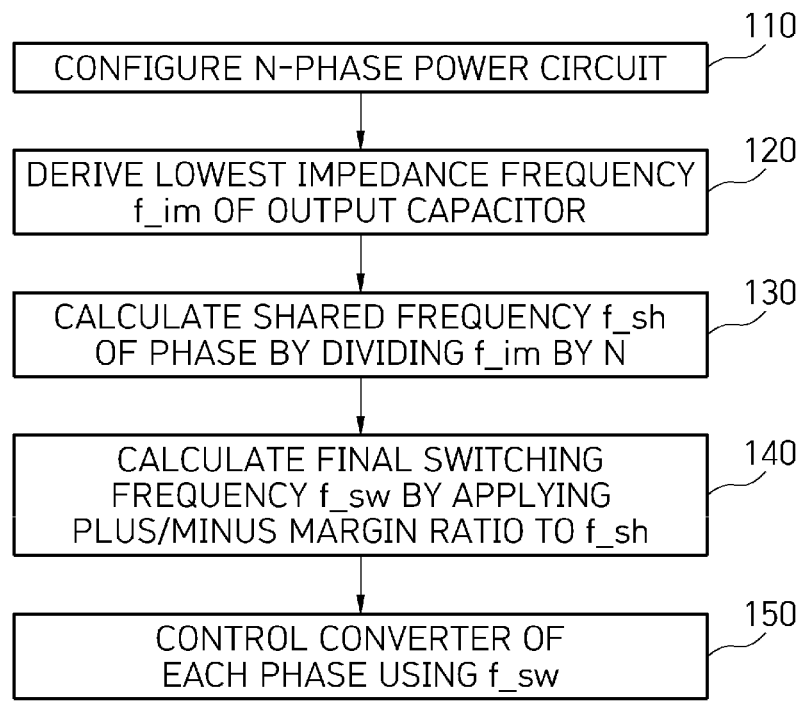
FIG. 4 is a flowchart of a processing procedure of a switching control method of the present invention.

The processing procedure of the switching control method of the present invention to which the method is applied is shown in FIG. 4.

First, as shown in FIG. 1, an N-phase power circuit is composed of N (for example, N=3) DC-DC converters, and one output capacitor is commonly connected to the output of each phase converter (110). Here, each phase constituting the N-phase power circuit is controlled in the interleaving manner with a phase delay of [360°/N] (for example, 120° for each phase in the case in FIG. 1). This interleaving control may be performed in the hardware and/or the software by a controller (for example, microcomputer) implemented in the BMS or EMS as described above.

Based on a specification of the output capacitor commonly connected to the output of each phase converter, a frequency f_im leading to the lowest impedance of the output capacitor is derived (120). According to one embodiment, the frequency f_im may be derived with reference to a pre-built table or external database. According to another embodiment, the frequency f_im is a unique characteristic of the capacitor, and thus may be calculated by substituting parameters such as a type, a capacitance, a withstand voltage, a dielectric, and the like of the output capacitor into a predetermined formula. In the case of the output capacitor in FIG. 3, the lowest impedance frequency f_im is roughly 1 MHz.

The frequency is divided by N (f_im/N) to calculate a shared frequency f_sh of each phase (130). In the embodiment in FIGS. 1 to 3, since the f_im is 1 MHz and N is 3, the shared frequency f_sh of each phase is 1 MHz/3, that is, roughly 333 kHz. The converter of each phase may be switched at the calculated phase shared frequency f_sh, and in this case, as mentioned above, the following procedure is performed to apply a margin to the shared frequency f_sh in consideration of a tolerance, an operational error, and the like of each component That is, a final switching frequency f_sw of each phase is calculated by applying a plus/minus margin ratio to the calculated f_sh (140). For example, as calculated above, the f_sh is roughly 333 kHz, and when a margin of 10% is applied thereto, the final switching frequency f_sw of each phase becomes roughly 300 kHz to 366 kHz.

Each phase converter is controlled by switching at the calculated switching frequency f_sw (150). Accordingly, a frequency of roughly 0.9 MHz to 1.098 MHz, which is the sum of the switching frequencies of the phases, is applied to the output capacitor, and thus, the output capacitor performs an electrostatic action with the lowest impedance as shown in FIG. 3. Accordingly, since the ESR is minimized, the ripple of the output voltage and current of the LDC power circuit is reduced, and thus, the lifespan of the low-voltage battery increases and the efficiency of the LDC increases.

A method process of the present invention shown in FIG. 4 may be performed in the hardware and/or software by the controller (for example, microcomputer), together with the above-mentioned interleaving control.

Figure 5:
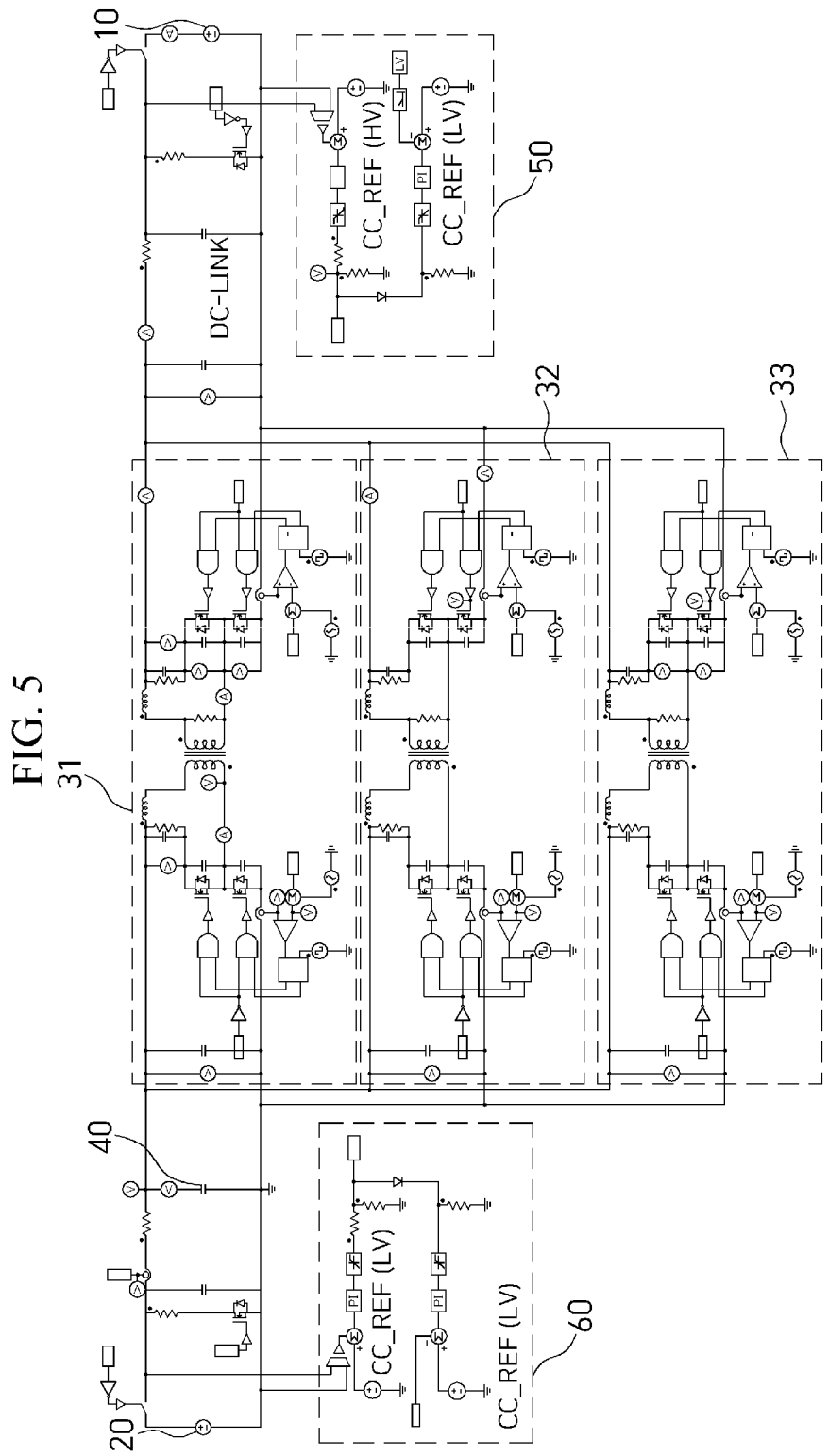
FIG. 5 is a circuit diagram of an LDC used in simulation for verification of the present invention.

FIG. 5 is a circuit diagram of an LDC according to the present invention used in simulation for verification of the present invention. Active-clamp flyback converter circuits 31, 32, and 33 are configured in three phases between the high voltage (HV) battery 10 at a right side and the low voltage (LV) battery 20 at a left side. It can be seen that the output capacitor 40, which is an ESR reduction target of the present invention, is commonly connected to each of the converter circuits 31, 32, 33. '50' and '60' respectively refer to a voltage/current measuring unit of a high voltage terminal (HV) and a voltage/current measuring unit of a low voltage terminal (LV).

Figure 6:
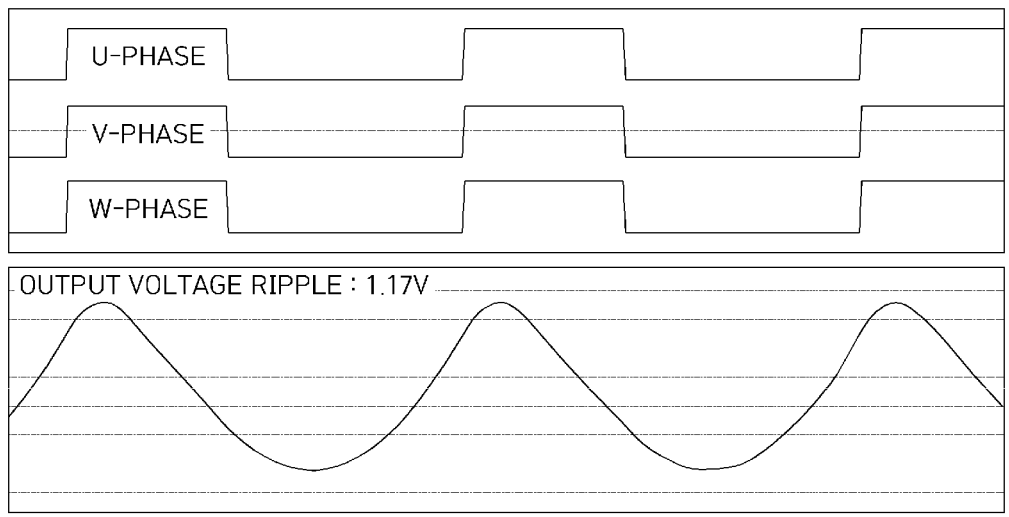
FIGS. 6 and 7 respectively illustrates measurement results of an output voltage ripple before and after applying phase interleaving control and a method of minimizing a parasitic resistance (ESR) of the output capacitor according to the present invention to a three-phase power circuit in FIG. 5.
Figure 7:
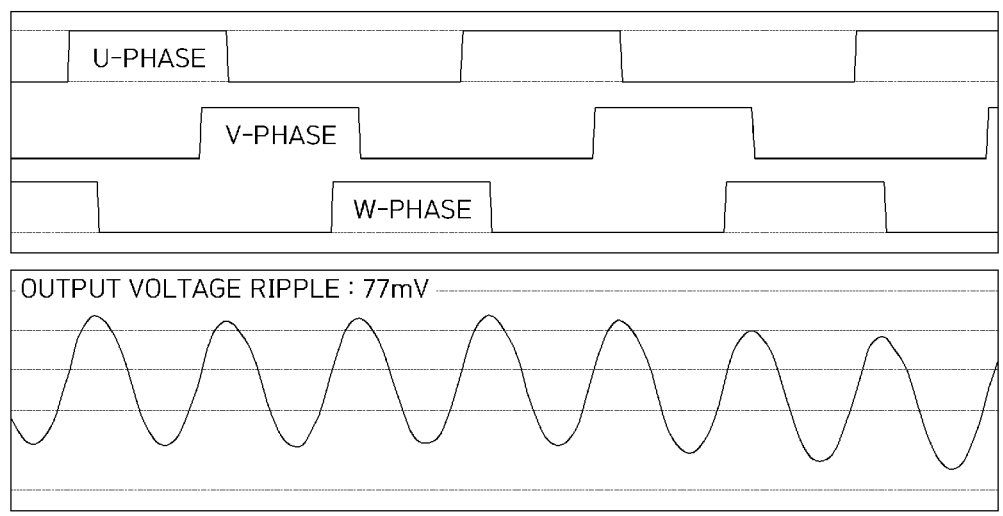

FIGS. 6 and 7 respectively illustrates measurement results of an output voltage ripple before and after applying phase interleaving control and a method of minimizing the parasitic resistance (ESR) of the output capacitor according to the present invention to the three-phase power circuit in FIG. 5. When the present invention is not applied, the output voltage ripple is measured to be roughly 1.17V as shown in FIG. 6, but when the present invention is applied, the output voltage ripple is improved to 77 mV as shown in FIG. 7.

The effects of the present invention are as follows. 1) Since the output capacitors are unified in common, the number of components is reduced, and thus cost reduction and failure reduction effects are acquired. 2) Since the switching frequency of the N-phase converter is shared by several phases, it is not necessary to use the switching element of each phase converter with high speed and high specifications. 3) Since the minimum impedance frequency is applied to the output capacitor and thus the parasitic resistance component is minimized, the ripple of the output voltage/current is reduced and thus the efficiency is increased. 4) Since the ripple is reduced, the generation of electromagnetic waves is minimized.

Although the present invention has been described in detail through preferable embodiments of the present invention, those skilled in the art may understand that the present invention may be embodied in specific forms other than contents disclosed in the specification without changing the technical spirit or essential features of the present invention. The above-described embodiments should be understood as being exemplary and not limiting. Further, the scope of the present invention will be shown by the appended claims rather than the above-described detailed description, and all possible changes or modifications in forms derived from the scope of the claims and equivalents thereof should be understood as being within the scope of the present invention.

What is claimed is:

1. An apparatus for minimizing a parasitic resistance of an output capacitor of a low-voltage DC-DC converter (LDC), comprising:
    an N-phase power circuit configured by connection of N DC-DC converters in parallel between a high-voltage (HV) battery and a low-voltage (LV) battery, in which N is a natural number greater than 1; and
    one output capacitor commonly connected to an output of each phase DC-DC converter, wherein each phase of the N-phase power circuit is controlled in an interleaving manner which delays a phase by 360°/N, and
    wherein each N-phase power circuit is controlled by switching at a frequency equal to f_im/N, in which f_im is a frequency at which the parasitic resistance of the output capacitor is minimized.

2. The apparatus of claim 1, wherein interleaving control of each phase of the N-phase power circuit is performed by one of a battery management system (BMS) and an engine management system (EMS).

3. A method of minimizing a parasitic resistance of an output capacitor of an LDC, comprising:
    connecting N DC-DC converters in parallel to configure an N-phase power circuit, and commonly connecting one output capacitor to an output of each phase DC-DC converter of the N-phase power circuit, wherein each phase DC-DC converter is interleaved with a phase delay of 360°/N, in which N is a natural number greater than 1;
    deriving a frequency f_im leading to a lowest impedance of the output capacitor commonly connected to the output of each phase DC-DC converter;
    calculating f_im/N to calculate a shared frequency f_sh of each phase by dividing the derived frequency f_im by N; and
    controlling the DC-DC converter of each phase by switching at the calculated shared frequency f_sh of each phase.

4. The method of claim 3, wherein the frequency f_im is derived with reference to a pre-built table or external database.

5. The method of claim 3, wherein the frequency f_im is derived using at least one of a type, a capacitance, a withstand voltage, and a dielectric of the output capacitor.

6. The method of claim 3, wherein the N is 3; the f_im is 1 MHz; and the f_sh is 1 MHz/3.

7. The method of claim 3, further comprising calculating a final switching frequency f_sw of each phase to control each phase DC-DC converter based on a margin ratio r % so that $f\_sh*(1-r\%) \leq f\_sw \leq f\_sh*(1+r\%)$.

8. An apparatus for minimizing the parasitic resistance of an output capacitor of a low-voltage DC-DC converter (LDC), comprising:
    an interleaving controller for interleaving control of an N-phase power circuit of the LDC including the N-phase power circuit configured by connecting N DC-DC converters in parallel and one output capacitor commonly connected to an output of each phase DC-DC converter with a phase delay of 360°/N, in which N is a natural number greater than 1; and
    a switching controller configured to derive a frequency f_im leading to the lowest impedance of the output capacitor commonly connected to the output of each phase converter, calculate f_im/N to calculate a shared frequency f_sh of each phase by dividing the derived frequency by N, and control each phase DC-DC converter of by switching at the calculated shared frequency f_sh of each phase.

9. The apparatus of claim 8, wherein the frequency f_im is derived in the switching controller with reference to a pre-built table or external database.

10. The apparatus of claim 8, wherein the frequency f_im is derived in the switching controller using at least one of a type, a capacitance, a withstand voltage, and a dielectric of the output capacitor.

11. The apparatus of claim 8, wherein the N is 3; the f_im is 1 MHz; and the f_sh is 1 MHz/3.

12. The apparatus of claim 8, wherein the switching controller is further configured to calculate a final switching frequency f_sw of each phase to control each phase DC-DC converter based on a margin ratio r % so that f_sh*(1−r %)≤f_sw≤f_sh*(1+r %).

* * * * *